United States Patent
Potier et al.

(10) Patent No.: US 12,345,323 B2
(45) Date of Patent: Jul. 1, 2025

(54) ROTARY EMA

(71) Applicant: Goodrich Actuation Systems SAS, Vernon (FR)

(72) Inventors: Karl Potier, Paris (FR); Sebastien Vandevoir, Gennevilliers (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 0 days.

(21) Appl. No.: 18/906,703

(22) Filed: Oct. 4, 2024

(65) Prior Publication Data
US 2025/0129843 A1  Apr. 24, 2025

(30) Foreign Application Priority Data
Oct. 19, 2023 (EP) .................................... 23306831

(51) Int. Cl.
*F16H 57/08* (2006.01)
*B64C 13/34* (2006.01)
*F16H 1/28* (2006.01)

(52) U.S. Cl.
CPC ........... *F16H 57/082* (2013.01); *B64C 13/34* (2013.01); *F16H 1/2827* (2013.01)

(58) Field of Classification Search
CPC ...... F16H 57/082; F16H 1/2827; B64C 13/34
See application file for complete search history.

(56) References Cited

U.S. PATENT DOCUMENTS

| | | | |
|---|---|---|---|
| 4,603,594 A | 8/1986 | Grimm | |
| 7,309,043 B2 | 12/2007 | Good et al. | |
| 8,450,894 B2 * | 5/2013 | Blanding | B64C 13/24 310/68 B |
| 9,038,944 B2 | 5/2015 | Senegas et al. | |

(Continued)

FOREIGN PATENT DOCUMENTS

| | | |
|---|---|---|
| DE | 102019111222 A1 | 11/2020 |
| EP | 4186788 A1 | 5/2023 |

(Continued)

OTHER PUBLICATIONS

Abstract for DE102019111222 (A1), Published: Nov. 5, 2020, 1 page.

(Continued)

*Primary Examiner* — Justin Holmes
(74) *Attorney, Agent, or Firm* — CANTOR COLBURN LLP

(57) ABSTRACT

An electromechanical actuator (EMA) assembly. The assembly includes: an electric motor; a drive shaft in engagement with the motor to be rotated about a shaft axis by operation of the motor; an output ring around the drive shaft, the output ring caused to rotate with rotation of the drive shaft, the output ring configured to be connected, in use, to a load to be driven by the EMA; a gear assembly between the drive shaft and the output ring to transmit rotation of the drive shaft to rotation of the output ring at a gear ratio. The gear assembly comprises a sun gear in engagement with the drive shaft, an outer gear in engage- (Continued)

ment with the outer ring, and planetary gears rotating between and transmitting rotation between the sun gear and the outer gear; and a planet carrier plate mounted to the planetary gears to rotate with the planetary gears.

11 Claims, 6 Drawing Sheets

(56) References Cited

U.S. PATENT DOCUMENTS

| | | |
|---|---|---|
| 10,035,585 B2 | 7/2018 | Schwartz |
| 10,399,668 B2 * | 9/2019 | Schwartz ................ F16D 11/14 |
| 2022/0250737 A1 | 8/2022 | Medina et al. |
| 2023/0160458 A1 | 5/2023 | Potier et al. |
| 2023/0216373 A1 | 7/2023 | Potier et al. |

FOREIGN PATENT DOCUMENTS

| | | | | |
|---|---|---|---|---|
| EP | 4257484 A1 | * | 10/2023 | ............. B64C 13/34 |
| JP | 2022170458 A | * | 11/2022 | ............. F16D 23/12 |

OTHER PUBLICATIONS

European Search Report for Application No. 23306831.1, mailed Mar. 18, 2024, 9 pages.

* cited by examiner

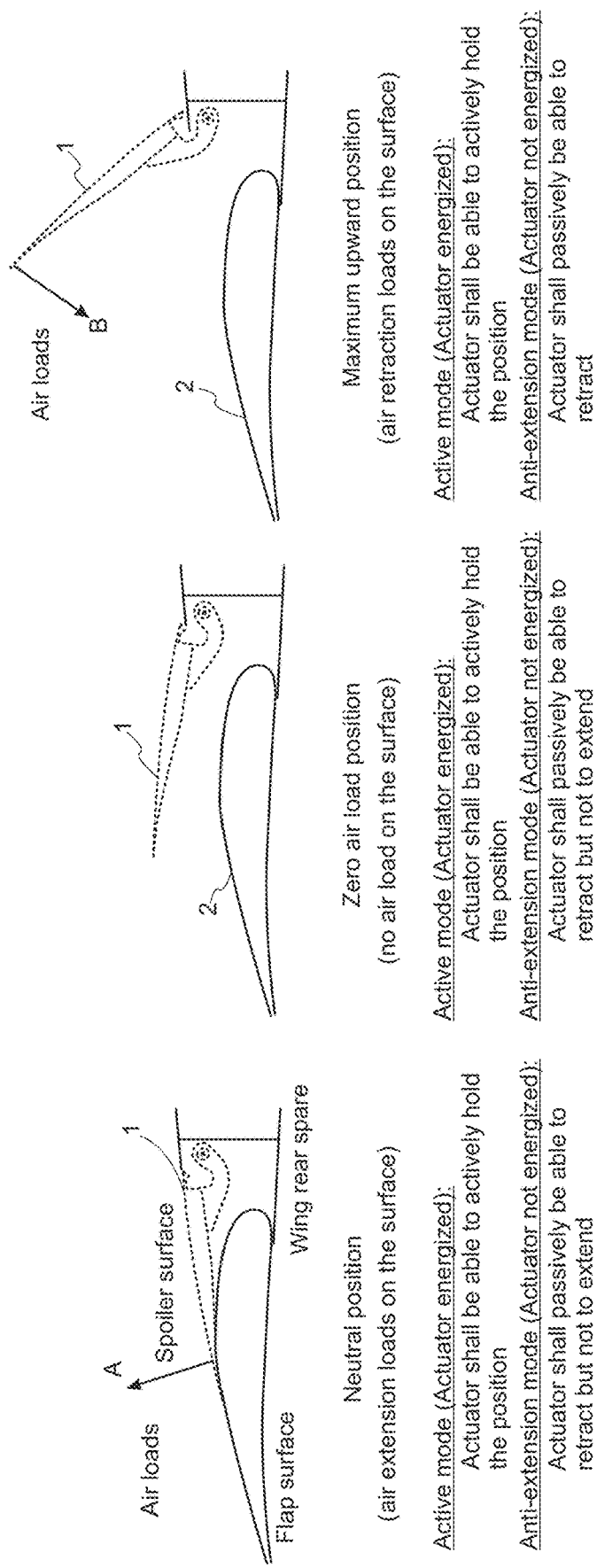

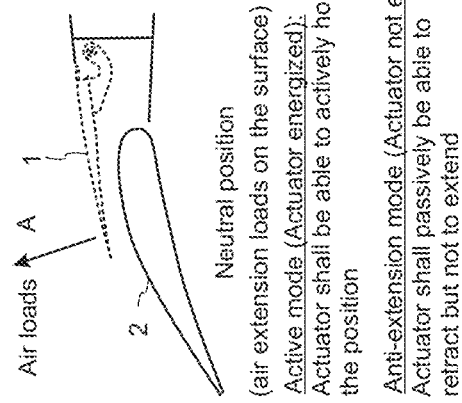

Air loads

Maximum downward position
(air extension loads on the surface)
Active mode (Actuator energized):
Actuator shall be able to actively hold the position
Anti-extension mode (Actuator not energized):
Actuator shall passively be able to retract and to extend

FIG. 2A

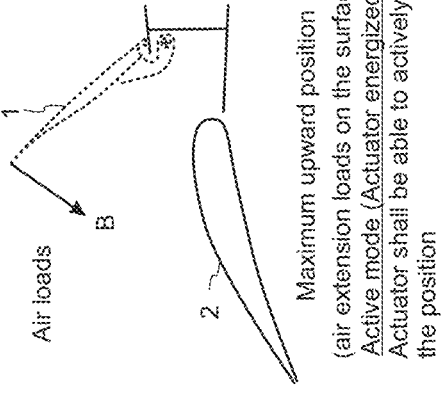

Air loads

Neutral position
(air extension loads on the surface)
Active mode (Actuator energized):
Actuator shall be able to actively hold the position
Anti-extension mode (Actuator not energized):
Actuator shall passively be able to retract but not to extend

FIG. 2B

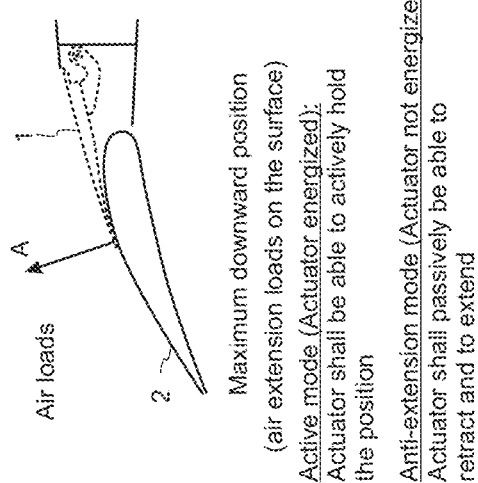

Zero air load position
(no air load on the surface)
Active mode (Actuator energized):
Actuator shall be able to actively hold the position
Anti-extension mode (Actuator not energized):
Actuator shall passively be able to retract but not to extend

FIG. 2C

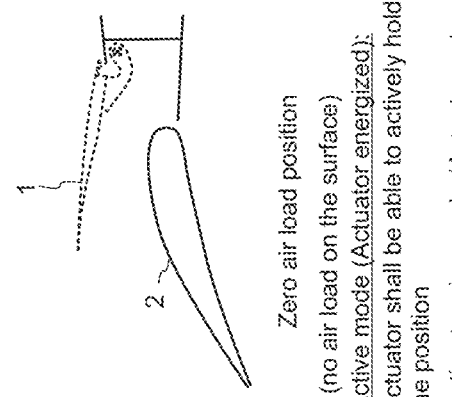

Air loads

Maximum upward position
(air extension loads on the surface)
Active mode (Actuator energized):
Actuator shall be able to actively hold the position
Anti-extension mode (Actuator not energized):
Actuator shall passively be able to retract

FIG. 2D

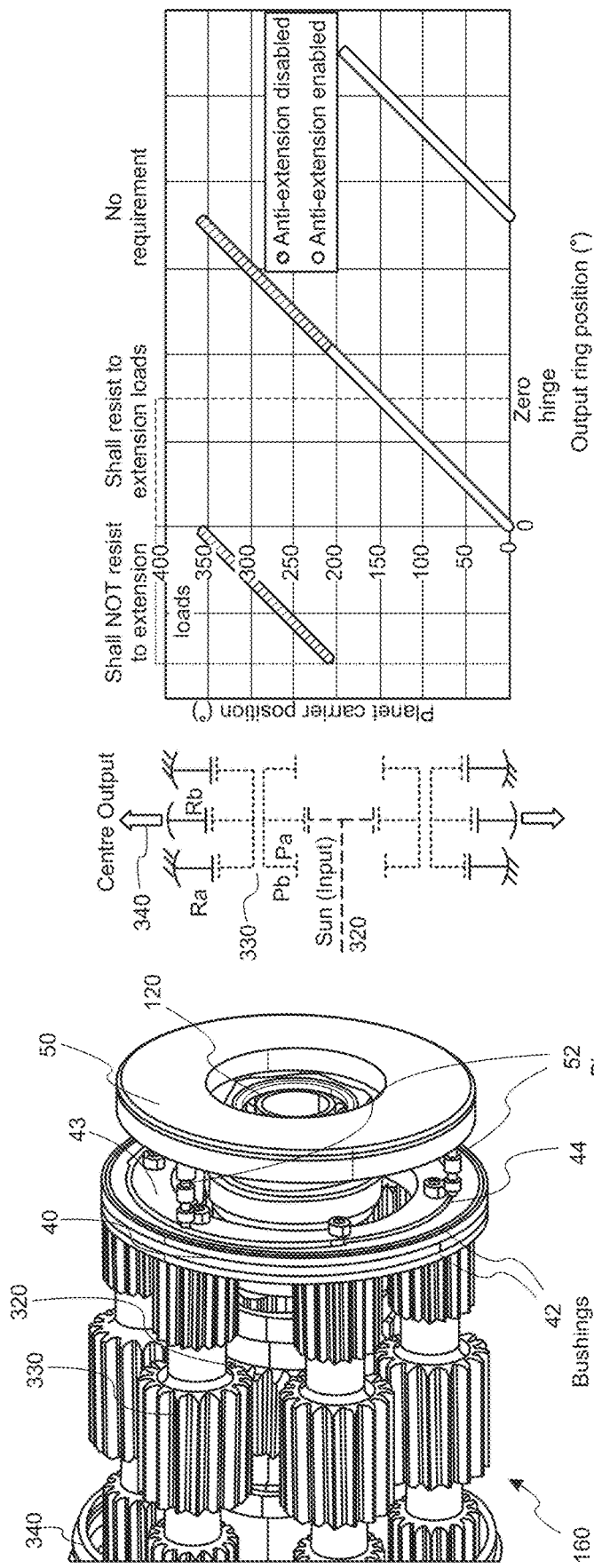

ROTARY EMA

CROSS-REFERENCE TO RELATED APPLICATIONS

This application claims the benefit of European Patent Application No. 23306831.1 filed Oct. 19, 2023, the disclosure of which is incorporated herein by reference in its entirety.

TECHNICAL FIELD

The present disclosure relates to an electromechanical actuator, EMA, such as for positioning moveable surfaces such as spoilers, wing flaps, etc. in aircraft and, in particular, a torque limiter device for a rotary EMA.

BACKGROUND

Actuators find many applications, particularly in controlling movement of a moveable component. In aircraft, many moveable components and surfaces are moved by means of an actuator.

Conventionally, many actuators, particularly in vehicles, aircraft, heavy machinery etc. are hydraulic actuators where components are moved in response to hydraulic or pressurized fluid. In general terms, a hydraulic actuator comprises a cylindrical housing in which is mounted an axially moveable piston rod. A free end of the piston rod that extends out of the housing is attached to a component or surface to be moved. Hydraulic fluid is provided to the actuator, from a hydraulic fluid supply in fluid communication with the interior of the actuator housing via the ports in the housing, to cause the piston rod to extend out of the housing, or hydraulic fluid is withdrawn from the housing to cause the piston rod to retract back into the housing. The movement of the piston rod is determined by the direction of, and pressure of the fluid applied to the actuator, which is in response to a control signal. As the piston rod moves relative to the housing, the moveable component or surface to which it is attached will move accordingly. To allow both extension of the rod and retraction of the rod, a valve is provided to set the movement to extension or retraction. This may be a servovalve, more specifically an electrohydraulic servovalve (EHSV).

Whilst hydraulic actuators have proven reliable and effective particularly in large load applications, the hydraulic parts of the system add considerably to the overall weight and size of the system. Also, hydraulic systems are subject to leakage and are not particularly clean.

There has, in recent years, been a move to replace hydraulic systems, in many fields, such as in aviation, with electrical or partly electrical systems which have reduced weight and footprint compared to hydraulic systems. With the move towards 'more electric aircraft' (MEE) or 'all electric aircraft' (AEE), for example, there has been a move towards using electromechanical actuators (EMA) to control the movement of movable surfaces and components.

In general, EMAs include an electric motor having an outlet shaft with first and second directions of rotation and a transmission assembly arranged to connect the shaft to the moveable surface.

One particular application for actuators (including EMAs) is in controlling movement of a spoiler on the wing of an aircraft. A spoiler is a moveable surface mounted on an aircraft wing behind the wing flap. When the aircraft is cruising, both the wing flap and the spoiler lay flat along the wing. To reduce aircraft speed, the spoiler is raised upwards relative to the wing.

The spoiler movement is caused by the actuator extending as described above in its so-called 'active mode'.

If electric power is lost when the spoiler is extended, excessive drag could be exerted by the spoiler. Systems are known, therefore, to retract the spoiler to its 'zero' position in the event of electric power loss thanks to aerodynamic loads. Usually, with hydraulic systems, this is by means of the EHSV being biased to a valve position where the high pressure fluid is provided to the chamber on the piston rod side of the piston head so that the pressure on that side of the head is greater than in the other chamber, causing the piston to retract into the housing.

Conventionally, a mechanical stop inside the housing stops the piston rod at the zero position.

Problems can also occur in spoiler control if there is a loss of hydraulic or motor power. Here a solution to prevent extension of the actuator, is an anti-extension function. It is known to locate an anti-extension device between a gearbox and a motor of the actuator, wherein when the anti-extension device is activated, the motor is protected against torque that is feeding-back through the system, e.g. resulting from loads on the flap, slat, or spoiler.

If the spoiler is extended, and pressure or power is lost, the spoiler will be retracted by aerodynamic load, and will gradually drop to become aligned with the wing surface until the zero hinge position is reached. The anti-extension function, activated on loss of power, keeps the spoiler at this position to prevent a spurious extension.

Most aircraft have a spoiler that operates using a positive stroke of the actuator rod—i.e. for extension of the rod to lift the spoiler. The stroke of the actuator is between a 'zero' position in the housing and an extended position and the control system is biased to return the rod to the zero position.

More recently, some aircraft have incorporated a 'droop' function in the spoiler, using a negative stroke of the piston rod—i.e. further back into the housing than the zero position or, put another way, a stroke moving from the zero position in the opposite direction to the direction moved in the positive stroke for extending the rod.

The droop function is used to lower the spoiler relative to the wing e.g. for high lift manoeuvres or to close a large air gap between the wing flap and the spoiler if the wing flap is extended.

A problem occurs in the area of overlap of the spoiler and the wing flap ranges of motion. If, for example, electrical power driving the spoiler is lost, the spoiler will, due to air loads, press against the wing flap, thus interfering with movement of the wing flap if retraction is demanded. Because of the anti-extension function which is activated on loss of power, the spoiler cannot be extended to allow pavement of the wing flap. EMAs have, therefore, been developed that include an active mode, an anti-extension mode and a droop function, the anti-extension function being disabled in droop mode, to avoid the problem of the spoiler becoming stuck in the droop state on loss of power.

Solutions to the problem of the anti-extension function and the droop function being in conflict typically use a mechanical device which is triggered by movement of the flap or which disconnects the anti-extension device when the EMA is in droop mode.

SUMMARY

The arrangement of the disclosure provides an electromechanical actuator, EMA, assembly comprising: an electric motor; a drive shaft in engagement with the motor to be rotated about a shaft axis by operation of the motor; an output ring around the drive shaft, the output ring caused to rotate with rotation of the drive shaft, the output ring configured to be connected, in use, to a load to be driven by the EMA; a gear assembly between the drive shaft and the output ring to transmit rotation of the drive shaft to rotation of the output ring at a gear ratio, wherein the gear assembly comprises a sun gear in engagement with the drive shaft, an outer gear in engagement with the outer ring, and planetary gears rotating between and transmitting rotation between the sun gear and the outer gear; a planet carrier plate mounted to the planetary gears to rotate with the planetary gears, the planet having an inner surface adjacent the planetary gears and an opposite outer surface, the outer surface having a cammed profile with respect to the axial direction, the cam profile rotating about the axis as the planetary gears and, therefore, the output ring rotate; and an interface plate adjacent the outer surface, the cammed profile being such as to engage the interface plate or not engage the interface plate, depending on the rotational position of the planet carrier plate.

BRIEF DESCRIPTION OF THE DRAWINGS

Examples of the solution provided by this disclosure will now be described with reference to the drawings. It should be noted that these are examples only, and the variations are possible within the scope of the claims.

FIGS. 1A to 1C illustrate typical spoiler surface functionality.

FIGS. 2A to 2D illustrate spoiler functionality with droop function.

FIG. 6A is an example of an architecture of an EMA modified according to this disclosure.

FIG. 6B is a schematic model of the gear configuration of FIG. 6A.

FIG. 6C represents the functionality of the arrangement of FIG. 6A graphically.

DETAILED DESCRIPTION

Figure 3:
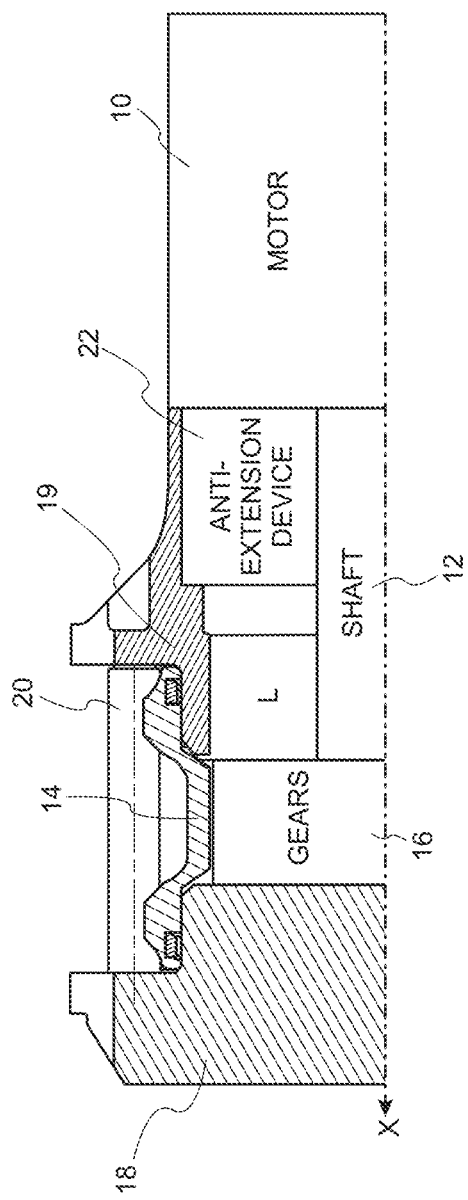
FIG. 3 shows a cross-section of a known rotary EMA.

The EMA of this disclosure will be described in relation to an actuator for an aircraft and, in particular, for controlling movement of a spoiler on an aircraft wing. It should be noted, however, that other applications can be envisaged for the EMA of this disclosure, that fall within the scope of the claims, and the description is by way of example only.

The background to this disclosure, and the problem to be solved has been set out above and will be briefly described with reference to FIGS. 1A to 1C and 2A to 2D. FIGS. 1A to 1C show the wing flap during a cruise phase of flight.

FIG. 1A shows a spoiler surface 1 in a neutral position relative to a surface of a wing flap 2. In the neutral position, air loads are acting on a spoiler extension direction A and the EMA that operates the spoiler, when energized—i.e. when in active mode—drives the spoiler to remain in that position against the wing flap, resisting the air loads. An anti-extension device (described further below) is present as a safety feature in the event that the power to the spoiler EMA fails—i.e. in the event that the EMA is not energized. The anti-extension device allows the EMA to retract, but not to extend—i.e. prevents the spoiler lifting, due to the air loads, relative to the wing flap 2, creating a gap between the spoiler and the flap.

When there is no air load on the spoiler surface, as in FIG. 1B,—i.e. in the zero air load position, the spoiler 1 lifts relative to the wing flap and, in the active mode, the actuator can actively hold this position. If power fails and the actuator is not energized, the function of the anti-extension device prevents extension of the actuator and, thus, further lifting of the spoiler. The spoiler surface can then move downwards under gravity as the EMA is able to passively retract. In the maximum upward position of the spoiler shown in FIG. 1C, air loads act on the spoiler to move it down towards the flap (arrow B). The actuator, in active mode, should be able to actively maintain this position. If power fails (anti-extension mode), the actuator will passively retract under the force of the air loads (B). Here, the anti-extension device is actually not needed, since the spoiler cannot extend further, and the air loads will naturally move it towards the flap in the event of power failure.

FIGS. 2A to 2D show the wing flap 2 in a deployed position as during take off and landing phases. FIG. 2A shows the spoiler in its maximum downward position (or droop state) below neutral, where the EMA is in negative stroke. Air loads are acting in the extension direction A on the surface of the spoiler. When the EMA is active, it actively holds the spoiler in this position. When the actuator is, however, not energised, it should passively retract but should also be able to extend to the neutral position.

FIG. 2B shows the neutral position of the spoiler, when the wing flap 2 is deployed. Air loads are, against, acting in the extension direction and so the actuator, when active, operates to hold the spoiler in the neutral position against these air forces forcing it upwards. If the actuator is not energized, the actuator should be able to passively retract but should be prevented from extending (by the ant-extension device).

The description of the zero air load position (FIG. 2C) and the maximum upward position (FIG. 2D) is essentially as for FIGS. 1B and 1C (the only difference being the orientation of the wing flap)

Referring back to FIG. 2A, as mentioned, the actuator, when not energised, should be able to extend. A conventional anti-extension device, however, would prevent, and so be in conflict with the desired operation when in droop mode/negative stroke.

The present disclosure aims to provide a solution to the conflict between the anti-extension function and the desired function in the maximum downward position (FIG. 2A).

Figure 4:
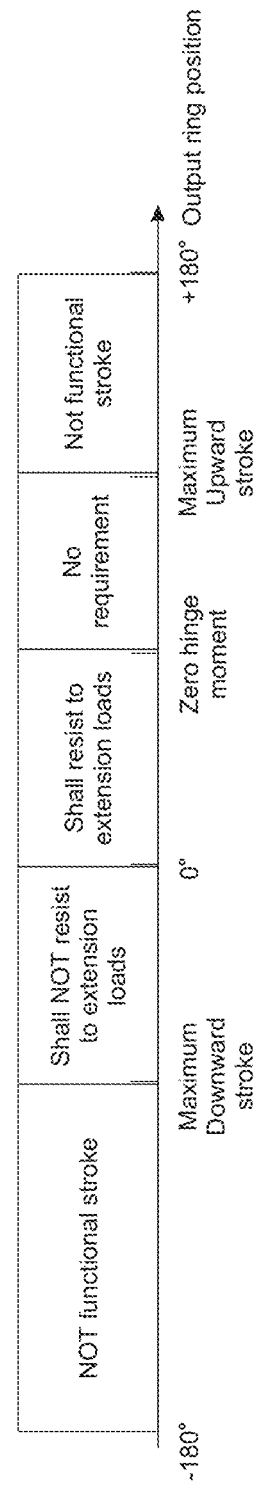
FIG. 4 explains the spoiler functionality with reference to output ring position for an EMA such as shown in FIG. 3.

FIGS. 3 and 4 provide some further background, showing an example of a rotary EMA incorporating an anti-extension device and the function of the ant-extension device at different rotary positions of the output ring of the EMA.

Referring first to FIG. 3, a typical rotary actuator comprises a motor 10 connected to rotate a shaft 12 which rotates an output ring 14 via a set of gears 16. The output ring 13, positioned between connected left and right bodies 18, 19, linked together by a mechanical linkage 20, rotates to drive rotation of the body to which it is attached to move that body—in the examples the body is the spoiler. An anti-extension device 22 is provided between the motor and the shaft. Depending on the output ring rotary position about the axis of rotation X of the shaft 12, the anti-extension device is passively enabled or disabled. This can be explained with reference to FIG. 4. When the position of the output ring 14 is between 0 degrees and the position corresponding to zero hinge moment, the EMA is in the neutral or zero load position as described above and the anti-extension device is operated to resist extension loads—i.e. to prevent extension of the EMA and, thus, the spoiler (but to allow passive retraction). Beyond the zero hinge moment position, in the positive stroke direction, up to the position corresponding to the maximum upward stroke position, there is, as described above in relation to FIGS. 1C and 2D, no requirement for an anti-extension operation. There is no functional stroke in the range between the maximum upward stroke and 180 degrees. In the negative stroke direction (to the left from the 0 degree position in FIG. 4), between 0 degrees and the maximum downward stroke position, i.e. droop, in the event of loss of power, the anti-extension device should not act to resist extension loads. Between the maximum downward stroke position and −180 degrees, there is no functional stroke.

In the known systems, it is difficult to connect the output ring 14 to the ant-extension device 22 because, since the overall functional stroke range is greater than 120 degrees, the device might interfere with the attachment of the left and right bodies. Furthermore, complex sealing is required and the arrangement can be susceptible to contamination by debris (FOD) and/or ice, which can affect its operation. Tight tolerances are also necessary for reliable operation of the arrangement.

Figure 5B:
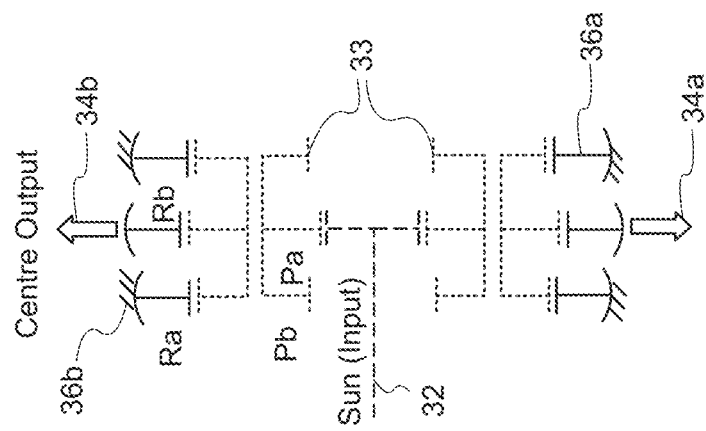
FIG. 5B is a schematic model of the gear configuration of FIG. 5A.
Figure 5A:
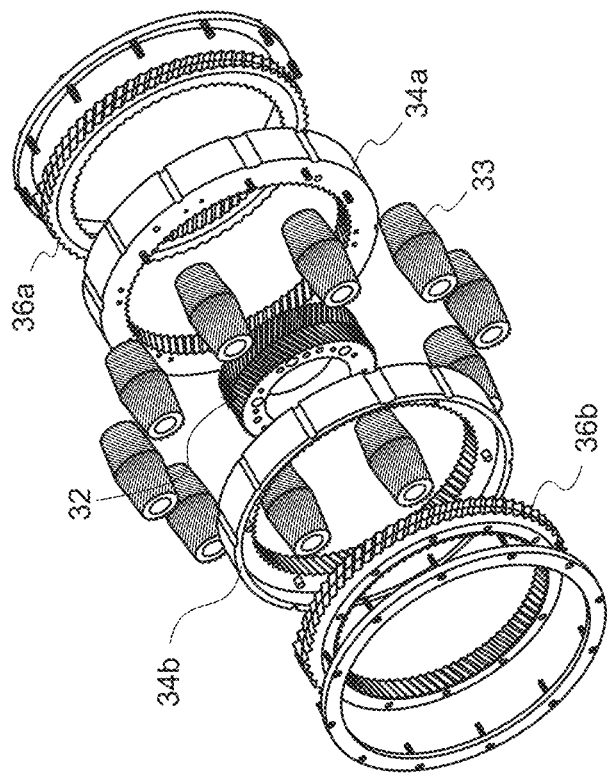
FIG. 5A is an exploded view of a typical gear configuration of a rotary EMA.

The gear configuration typically used in such EMAs is a compound gear configuration with a high gear ratio. An example is shown in FIGS. 5A and 5B. The compound gear configuration 16 typically comprises a sun gear 32 which engages with the rotary shaft 12. Rotation of the sun gear, due to rotation of the shaft causes rotation of the output gear (here a left and a right output gear 34a, 34b for the left and right bodies) via planetary gears 33 positioned between the sun gear and the output gears. A stationary ring gear 36a, 36b is provided at each end of the gear assembly 16. An advantage of such a configuration is that when the output ring moves, the planetary rings also rotate around the sun input. For example, an output ring rotation of 140 degrees causes planetary rotation of 720 degrees.

The solution to the droop and anti-extension conflict, according to this disclosure, and as best seen in FIG. 6A, is achieved by adding, to the gear assembly, a planet carrier having three mechanical cams formed thereon, which cooperate with an interface place which cooperates with an anti-extension device. By this arrangement, described further below, depending on the rotary position of the output ring, and making use of the planetary gears which rotate several rotations for each rotation of the planetary ring, the cams engage differently with the interface plate which, in turn contacts the anti-extension device to enable or disable that device in dependence on the output ring rotary position.

The gear assembly 160 is, for the most part, the same as the known gear assembly such as described above, as can be seen from FIG. 6B, with a sun gear 320 mounted around and in gear engagement with the EMA shaft 120. Rotation of the shaft causes rotation of the sun gear which causes, via rotation of intermediate planetary gears 330, rotation of the output gear 340 as described above.

The modified gear assembly uses the rotation of the planetary gears 330 to enable or disable an anti-extension device which is not shown here but which can be a known type of anti-extension device and can be located at an internal location of the EMA directly adjacent the gears (e.g. in the location indicated by the letter L in FIG. 3) instead of where the anti-extension device 22 is shown as being located.

A planet carrier 40 in the form of a plate is mounted to the planetary gears 330 via bushings 42, to rotate with the planetary gears. The planet carrier 40 has an outwardly facing surface 43, on its side facing away from the planetary gears, and this is formed with a cammed profile 44 which rotates as the gears, and, therefore, the output ring 340 rotate. An interface plate 50 is mounted about the shaft, axially spaced from the outwardly facing, cammed surface of the planet carrier 40. Pins 52 are located between the planet carrier outwardly facing surface and the interface plate (more precisely, an axially inwardly facing surface of the interface plate). As the planet carrier rotates, due to its cammed profile, the spacing between the carrier and the pins varies. At some rotational positions, the cam is spaced axially further away from the pins than at other rotational positions. At some rotational positions, the cam is spaced relative to the pins so as to push axially against the pins which, in turn, cause an axial movement of the interface plate in direction Y, forcing it into contact with the anti-extension device to enable the anti-extension device. At other rotational positions, the part of the surface of the planet carrier facing the interface plate is further away from the plate and so does not push to pins and the interface plate to enable the anti-extension device.

The effect of the cams can be seen in the graphical illustration of FIG. 6C.

The cam profile is formed such that for the rotational position of the output ring between 0 degrees and the zero hinge moment, the cam surface presses the pins to push the interface plate axially in direction Y to enable the anti-extension device. Where the anti-extension device is not required because the position is between zero air load and maximum upward position, the cam is so as to not push the interface plate into operating engagement with the anti-extension device. To the left of FIG. 6C, the negative stroke or droop position is seen. Here the planet carrier rotary position is such that the cam depth does not push the interface plate (via the pins) into engagement with the anti-extension device and so that device is not enabled.

Figure 7B:
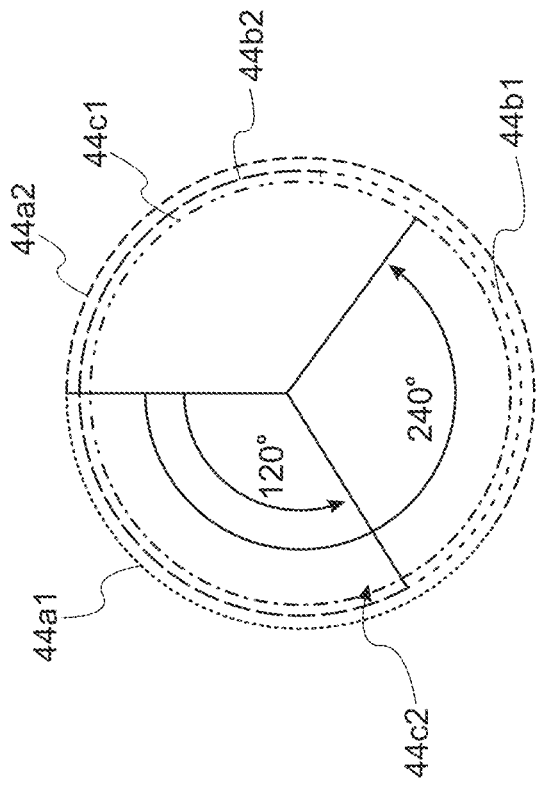
FIG. 7B is a schematic model of the arrangement of FIG. 7A.
Figure 7A:
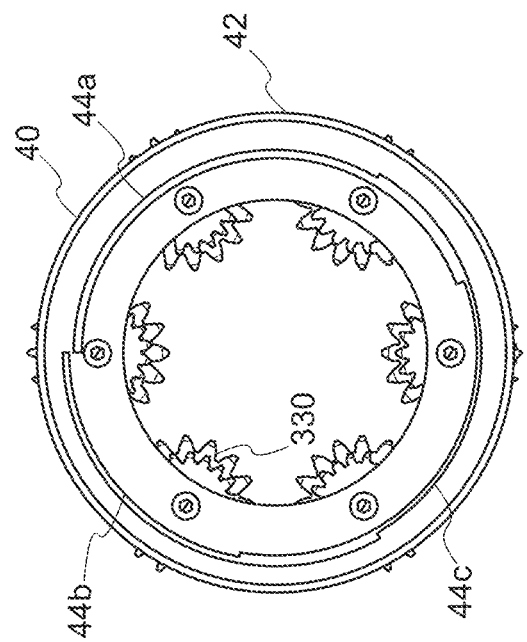
FIG. 7A is an end view of an arrangement such as shown in FIG. 6A.

Whilst various cam shapes and configurations are possible for the cam profile, in one example, the cam profile comprises three cams 44a, 44b, 44b each extending around approximately 120 deg. around the surface of the planetary carrier as shown in FIGS. 7A and 7B. To avoid the cams overlapping, the three cams may each have a slightly different radius, and three pins are provided. This ensures a balanced load on the pins. With reference to FIG. 7B, as an example, 44a1 represents the rotary position where a first cam 44a disables the anti-extension device and line 44a2 represents the rotary position where a first cam 44a enables the anti-extension device. Line 44b1 represents the rotary position where a second cam 44b disables the anti-extension device, and line 44b2 represents the rotary position where the second cam 44b enables the anti-extension device. Line 44c1 represents the rotary position where a third cam 44c disables the anti-extension device, and line 44c2 represents the rotary position where the third cam 44c enables the anti-extension device.

The design according to this disclosure provides a compact, simple and relatively inexpensive solution to providing the anti-extension function without the need for seals or tight manufacturing or assembly tolerances. To adjust the arrangement for a given application, mechanical rigging is possible.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An electromechanical actuator (EMA) assembly comprising:
   an electric motor;
   a drive shaft in engagement with the motor to be rotated about a shaft axis by operation of the motor;
   an output ring around the drive shaft, the output ring caused to rotate with rotation of the drive shaft, the output ring configured to be connected, in use, to a load to be driven by the EMA;
   a gear assembly between the drive shaft and the output ring to transmit rotation of the drive shaft to rotation of the output ring at a gear ratio, wherein the gear assembly comprises a sun gear in engagement with the drive shaft, an outer gear in engagement with the outer ring, and planetary gears rotating between and transmitting rotation between the sun gear and the outer gear;
   a planet carrier plate mounted to the planetary gears to rotate with the planetary gears, the planet carrier having an inner surface adjacent the planetary gears and an opposite outer surface, the outer surface having a cammed profile with respect to the axial direction, the cam profile rotating about the axis as the planetary gears and, therefore, the output ring rotate; and
   an interface plate adjacent the outer surface, the cammed profile being such as to engage the interface plate or not engage the interface plate, depending on the rotational position of the planet carrier plate.

2. The EMA of claim 1, wherein the cammed profile comprises a plurality of profile sections extending circumferentially around the outer surface.

3. The EMA of claim 1, further comprising:
   pins extending axially from the interface plate, and wherein the cammed profile, when it engages with the interface plate, engages with the interface via the pins.

4. The EMA of claim 3, comprising three of said pins each arranged to engage with a corresponding cammed profile section.

5. The EMA of claim 4, wherein each cammed profile section is radially spaced from the other sections.

6. The EMA of claim 5, comprising three cammed profile sections each extending substantially 120 degrees circumferentially around the planet carrier plate.

7. The EMA of claim 1, wherein the interface plate is configured to move axially when engaged by the cammed profile.

8. The EMA of claim 1, further comprising an anti-extension device, and wherein the interface place is configured to enable or disenable the anti-extension device depending on whether or not the cammed profile engages the interface plate.

9. The EMA of claim 8, wherein the anti-extension device is configured to prevent extension of the EMA when enabled.

10. The EMA of claim 1, wherein the planet carrier plate is mounted to the planetary gears via bushings.

11. A combination comprising:
    a spoiler of an aircraft; and
    an EMA of claim 1 wherein the outer ring connected to the spoiler, the EMA varying the position of the spoiler due to rotation of the outer ring.

* * * * *